United States Patent [19]

Stute et al.

[11] Patent Number: 5,908,653

[45] Date of Patent: Jun. 1, 1999

[54] SEASONING SAUCE

[75] Inventors: Rolf Stute, Remseck; Rudi Müller, Sinsheim, both of Germany

[73] Assignee: CPC International Inc., Englewood Cliffs, N.J.

[21] Appl. No.: 08/910,444

[22] Filed: Aug. 5, 1997

[30] Foreign Application Priority Data

Aug. 12, 1996 [DE] Germany .......................... 196 32 452

[51] Int. Cl.$^6$ .............................. A23L 1/238; A23L 1/10; A21D 2/00

[52] U.S. Cl. .............................. 426/589; 426/18; 426/20; 426/46

[58] Field of Search ................................ 426/18, 20, 46, 426/61, 62, 589

[56] References Cited

U.S. PATENT DOCUMENTS

| | | | |
|---|---|---|---|
| 3,852,479 | 12/1974 | Yokotsuka et al. | 426/44 |
| 3,912,822 | 10/1975 | Yokotsuka et al. | 426/44 |
| 4,180,591 | 12/1979 | Kazuo et al. | 426/18 |
| 4,382,964 | 5/1983 | Noda et al. | 426/7 |
| 4,407,826 | 10/1983 | Noda et al. | 426/7 |
| 4,684,527 | 8/1987 | Motai et al. | 426/46 |
| 5,244,790 | 9/1993 | Kim | 435/42 |
| 5,407,690 | 4/1995 | Muller et al. | 426/18 |
| 5,665,407 | 9/1997 | Nagata et al. | 426/18 |

FOREIGN PATENT DOCUMENTS 60-037946  2/1985  Japan .

OTHER PUBLICATIONS

Oh et al., "Studies on the Fermentation of Lupin Seed (II)—Preparation of Traditional Korean Fermented Bean Sauce and Paste", Korean Journal of Applied Microbiology and Bioengineering, 11 (3), 241–248 (1983).

K.H. Steinkraus "Industrialization of Indigenous Fermented Foods," Marcel Dekker, New York and Basle, 1989.

European Search Report dated Nov. 18, 1997.

T.V. Hung, H.H. Jiang, P.G. Drew, R.G. Black, Characterisation of Yeasts and Bacteria in Lupin–soy Sauce Fermentation ASEAN Food Journal vol. 8, No. 3, 1993, 99–104.

Japanese Patent Abstract 60037946, Preparation of Fermented Food With High Protein Content.

EP 97113335, Nov. 18, 1997, European Patent Search.

Sung–Hoon Oh, et al., Aug. 25, 1983, Studies on the Fermentation of Lupin Seed.

Hung, Jiang, et al., Jul. 1993, Characterization of Yeasts and Bacteria in Lupin–soy Sauce Fermentation.

H.D. Belitz et al., "Comparative Studies on the Bitter Taste of Amino Acids", Lebensmittel: Wissenschaft und Technik 5; 47–50 (1972).

6th International Lupin Conference Proceedings, The Lupin as Raw Material For the Production of Soy Sauce by Fermentation, Chile.

6th International Lupin Conference Proceedings, Lupin as Raw Material For Shoyu Production, Chile, 1990.

*Primary Examiner*—Nina Bhat
*Attorney, Agent, or Firm*—Norris, McLaughlin & Marcus, P.A.

[57] ABSTRACT

Seasoning sauce based on lupins which has a higher degree of protein breakdown and a higher degree of hydrolysis than comparable seasoning sauces from the prior art. The seasoning sauce can be obtained by subjecting lupins, together with a carbohydrate source, preferably wheat, to a solid culture with addition of *Aspergillus oryzae* as starter culture. The resulting *koji* is mashed with addition of brine and is fermented after addition of a yeast starter culture, preferably *Zygosaccharomyces rouxii*, and then subjected to ripening.

10 Claims, No Drawings

SEASONING SAUCE

FIELD OF THE INVENTION

This invention pertains to seasoning sauces and processes for their production. Specifically, the present invention relates to a seasoning sauce which has a markedly different specific flavor profile and a higher glutamic acid content than conventional seasoning sauces.

BACKGROUND OF THE INVENTION

Seasoning sauces and processes for their production by fermenting protein-rich raw materials have been known in principle since antiquity.

A well known example is the seasoning sauce "garum" of the Romans, produced by fermenting fish, the flavor qualities of which are highly praised in the literature of the period, but whose recipe and production have not been passed on.

The seasoning sauces of the Chinese are older still (about 1100 B.C.); in these fish or meat was likewise first used as protein source. Soya beans or soya flour, the protein source preferred to the present day, were first mentioned in 535 B.C. The carbohydrate source needed to initiate fungal growth was a cereal product right from the beginning, usually, wheat. However, rice and barley are also mentioned in the tradition.

Other carbohydrate sources such as oats, millet, etc. are also suitable in the same way in this context, just as different protein sources can in principle be used, as the history of these seasoning sauces shows.

The combination soya/wheat is of considerable importance, these starting materials being used in different forms (whole grain, crushed, flour, roasted, etc.), depending on the soy sauce type. In general, 5 soy sauce types can be differentiated; koikuchi-, usukuchi-, tamari-, saishikomi- and shiroshoyu, which are further subdivided into three classes and differ principally in the ratio of the two base raw materials and in the production conditions.

Various flavors of seasoning sauces are achieved principally via a modification of the carbohydrate sources and of the process parameters of the production processes.

Apart from the typical aroma substances, the flavor of a soy sauce is very greatly determined by the amount of the protein and free amino acids in the solution, which are formed owing to the breakdown of protein proceeding in the fermentation to give free amino acids and peptides. A sauce having the best possible flavor should have the greatest possible amount of dissolved protein and free amino acids.

The content of dissolved protein is also termed degree of protein breakdown and is conventionally determined from the total nitrogen content (total N), taking into account the DM (dry matter) content. The content of free amino acids in a soy sauce is generally quoted as degree of hydrolysis. For premium quality soya-based sauces, a degree of protein breakdown of about 1.1–1.5% total N (at a dry matter or DM content of about 30% and a NaCl content of 15%) and a free amino acid content (degree of hydrolysis) of greater than 50% of the protein (calculated as free amino acid/total amino acids before and after acid hydrolysis of the sauce) are customary.

The flavor of a soy sauce is also determined to a great extent by the composition of the free amino acids, some of which have sweet (serine, glycine, alanine), sulphurous (methionine) or bitter (proline, leucine, tyrosine) tastes. Phenylalanine, tryptophan and arginine have particularly intensive bitter tastes which are 5, 10 and 20 times, respectively, more bitter than leucine or proline (see H. D. Belitz et al., "Comparative Studies on the Bitter Taste of Amino Acids," *Lebensmittel: Wissenschaft und Technik* 5: 47–50 (1972).

In the production of an aromatic seasoning sauce having a balanced, non-bitter basic taste, these amino acids (especially arginine) should therefore be present at particularly low concentration.

There are numerous attempts to obtain special taste and aroma profiles and to increase, in particular, the content of glutamic acid.

This is achieved most simply, and, therefore, correspondingly frequently, by adding ingredients during, or (since this is still simpler) after the fermentation (e.g., by addition of sugar, spices, seasonings etc.). These sauces are also termed formulated sauces.

A higher content of glutamic acid is of interest primarily owing to the flavor enhancing properties of glutamate. In addition to the possibility of adding glutamate to the seasoning sauces, it would be more advantageous to increase the glutamic acid content by using glutamic-acid-rich raw materials or by controlling the fermentation, e.g., by using glutaminase-active starters, as described, for example, in U.S. Pat. Nos. 3,912,822 and 3,852,479.

Lupins have also already been considered as starting material for seasoning sauces in the prior art, since they have a fundamentally similar composition to soya beans and also, more precisely, with regard to their amino acid composition, as can be seen in the following Table 1.

TABLE 1

Comparison between amino acid composition of soya flour (defatted) and lupin seeds [%]

|  | Lupin cotyledons | Soya flour* |
|---|---|---|
| Glutamic acid | 21.2 | 19.2 |
| Aspartic acid | 10.6 | 11.4 |
| Threonine | 4.0 | 4.2 |
| Serine | 5.0 | 5.2 |
| Proline | 3.6 | 4.9 |
| Glycine | 4.2 | 4.4 |
| Alanine | 3.5 | 4.4 |
| Valine | 5.2 | 5.2 |
| Methionine | 0.7 | 1.1 |
| Isoleucine | 4.6 | 4.5 |
| Leucine | 8.2 | 8.1 |
| Tyrosine | 5.2 | 3.5 |
| Phenylalanine | 4.2 | 5.3 |
| Lysine | 5.1 | 6.2 |
| Histidine | 2.6 | 2.6 |
| Arginine | 8.6 | 7.3 |
| Crude Protein content | 36 | 44 |

*New form

Corresponding attempts to produce a seasoning sauce based on lupin seeds were reported in 1990 at the 6th International Lupin Conference in Chile. However, the lupin seed-based products disclosed there did not have the degrees of protein breakdown usual in soy sauces, which, in addition to the type of amino acids released, are likewise important for a high taste intensity. Thus the nitrogen content as formol N was only 0.13 to 0.19% and as total N was only 0.53 to 0.66%. In contrast, a commercial soy sauce achieves degrees of protein breakdown, as formol N, of about 0.35–0.7%, and as total N, of about 1.1–1.5% (at a DM content of about 30% and a NaCl content of about 15%). This corresponds to a degree of release of amino acids of greater than 40%. More detailed analytical studies of these lupin-based seasoning sauces were not carried out. However, in a taste test, no significant difference was observed between the taste of a soy sauce and a lupin-based sauce.

Attempts to use lupin seeds instead of soya beans for the production of bean sauce and bean paste (meju) are also reported in Oh, et al., "Studies on the Fermentation of Lupin Seed (II)—Preparation of Traditional Korean Fermented Bean Sauce and Paste," *Korean Journal of Applied Microbiology and Bioengineering,* 11 (3): 241–248 (1983).

"Meju" is a Korean seasoning sauce which is conventionally obtained by fermenting soya beans. However, the fermentation process is fundamentally different from the production of soy sauce conventional in Japan, in particular of the koikuchi type. Although, in both cases, the fermentation process begins with a solid culture after an inoculation, preferably with *Asp. oryzae*, in the case of the "meju" fermentation, the solid culture is with soya beans alone, in contrast to a soya bean/carbohydrate mixture. Whereas in the case of soy sauce production, the culture is continued, after mashing, by addition of brine and inoculation with a salt-tolerant yeast, as a fermentation (in which case infection with bacteria must be largely avoided, to avoid faulty fermentation), in the "meju" case, the solid culture is continued with simultaneous drying (traditionally in the sum, otherwise, for example, for 3 days at 60° C.) and a specific bacterial growth (predominantly *Bacillus subtilis*) is sought. There is no fermentation stage, but the "meju" is taken directly to the ripening process after mashing.

In accordance with these fermentation processes, seasoning sauces are obtained which have a very dark color, strong taste and very low pH.

Accordingly, in the Korean publication, when lupins are used in the "meju" fermentation, after ripening for two weeks, a degree of hydrolysis of 40–50% and a crude protein content (=total protein content) of 15–18% based on DM are achieved. This corresponds, at a DM content of such sauces of conventionally 20–30%, to a crude protein content of 3–5.4%, and a degree of protein breakdown of 0.48 to a maximum of 0.86%. In addition, the product made from lupins has a markedly bitter taste.

Despite the numerous products on the market of different colors, flavors, etc., there is still a requirement for novel seasoning sauces. This applies to the multiplicity of seasoning sauces known in Asia and on the market, particularly for European and American cuisine, because the products available to date still predominantly represent an Asian type of flavor (roasty, malty) and are frequently highly bitter.

An object of the present application is, therefore, to provide a seasoning sauce which can be produced on the basis of traditional fermentation technology, but which has a markedly different specific flavor profile and a higher glutamic acid content than conventional seasoning sauces based on soya beans.

A particular object of the present invention is to reduce the bitter taste of the seasoning sauce, so that it can also be used to a greater extent in European and American cuisine.

All in all, an object of the present invention is to provide a seasoning sauce as light as possible having as neutral a taste as possible.

SUMMARY OF THE INVENTION

The invention provides a seasoning sauce based on lupins which has a protein content of more than 0.7% total N and a degree of hydrolysis greater than 50% (calculated as free amino acid/total amino acids). The seasoning sauce can be obtained by means of the fact that lupins, together with a carbohydrate source, preferably wheat, are subjected to a solid culture with addition of *Aspergillus oryzae* as starter culture. The resulting *koji* is mashed with addition of brine and is fermented after addition of yeast starter culture, preferably *Zygosaccharomyces rouxii*, and then subjected to ripening.

DETAILED DESCRIPTION OF THE INVENTION

To achieve the objects of the present invention, preference is given to seasoning sauces which contain more than 18%, in particular more than 20%, glutamic acid and more than 9%, in particular more than 13%, aspartic acid. The total of glutamic and aspartic acids is preferably more than 25% and, in particular, preferably more than 33%. The arginine content is preferably 2.5% or less, in particular 1% or less, particularly preferably less than 0.5%. The above mentioned percentages relate to the total content of amino acids in the seasoning sauce.

The protein content is preferably more than 0.9% total N. Particular preference is given to a protein content in the same range as is conventional in commercial soy sauces, i.e., about 1.1–1.5% total N.

The degree of hydrolysis of the seasoning sauce of the invention is preferably greater than 60% and is generally between 60 and 80% (calculated as free amino acid/total amino acids).

According to the invention, seasoning sauces of the tamari type are not preferred. Particular preference is given to seasoning sauces of the koikuchi type.

For an optimal taste quality, it is further advantageous to use sweet lupins, i.e., lupins having a low alkaloid content. Particular preference is given to the sweet lupin cultivar "Minori."

In principle, as Example 4 shows, bitter lupins are also suitable and the same results are achieved with respect to degree of hydrolysis and amino acid spectrum, but, if the alkaloid content cannot be decreased to below a concentration of 0.4%, or preferably below 0.02%, in the conventional pretreatment stages (steeping, washing, autoclaving), an additional steeping and washing should be carried out.

Surprisingly, it has been found that, starting from lupins, not only may the traditional soy sauce technology be applied, but also glutamic-acid-rich seasoning sauces may be produced which differ greatly in amino acid composition from soy sauce and have a particularly light and neutral taste.

Because of its less intensive taste, a seasoning sauce produced from lupins is considerably more suitable for the production of seasoning mixtures and reaction flavorings than a seasoning sauce produced from soya beans.

The use of lupins instead of soya beans not only achieves a considerable increase of the glutamic and aspartic acid contents, which are important for the flavor enhancing action, but also achieves a decisive reduction of the arginine content, i.e., the amino acid having the most intensive bitter taste.

It is surprising for those skilled in the art that the lupin-based seasoning sauces of the invention, in contrast to the disclosure of *Korean J. Appl. Microbiology and Bioengineering,* 11 (3): 241–248 (1983), do not have a bitter taste and in this respect are even superior to soy sauces in terms of taste.

The low content of arginine (and also of tryptophan) and the high contents of glutamic and aspartic acids in seasoning sauces made from lupins were not predictable, because the contents of these amino acids in the starting product lupin seeds virtually do not differ from those in soya beans. The differing release during enzymatic protein hydrolysis therefore indicates different binding in the lupin proteins in comparison with the soya protein, which has not been recognized to date in the prior art.

The seasoning sauce of the invention is simultaneously glutamic-acid-rich and aspartic-acid-rich, harmonious, light and non-bitter-tasting. It is suitable not only for use as a pure seasoning sauce, but in particular for producing seasoning mixtures and for producing reaction flavorings.

The seasoning sauce of the invention may, in principle, be produced by a process as is known from the traditional soy sauce technology.

In this process, as in the traditional soy sauce technology, different carbohydrate sources can be used without any significant influence on the result in the amino acid spectrum. The carbohydrate content in the lupin/carbohydrate starting mixture is generally 20–70%, preferably 40–60%.

Soy sauces are generally produced by the following three fundamental process steps:

a) The koji phase. In this step, a semi-moist mixture of soya beans and the cereal component (usually wheat) is inoculated with a fungus (generally *Aspergillus oryzae* or *sojae*).

Step a) results in a fungal mycelium permeating the moist mass, which provides the enzymes, in particular the proteases, for the following step b).

b) The Moromi phase. The moromi phase is part of a submerged culture. A salt solution (brine fermentation) together with salt-tolerant lactobacillae and yeasts are added thereto. This step ensures, inter alia, substantial breakdown of the proteins to give free amino acids and low-molecular peptides. In the moromi phase, a ripening process also occurs which gives the product the desired end flavor as a result of fermentation processes (and Maillard processes).

c) Finally, the ready-to-eat product is produced by refining.

An extensive description of the various production processes, including the biochemical pathways characteristic of the individual process stages, is given in K. H. Steinkraus "Industrialization of Indigenous Fermented Foods," Marcel Dekker, New York and Basle, 1989.

The seasoning sauces of the invention are obtainable by means of the fact that lupins, together with a carbohydrate source, preferably wheat, are subjected to a solid culture as a mixture having a 20–70% by weight, preferably 40–60% by weight, wheat content, with addition of *Aspergillus oryzae* as starter culture. The resulting *koji* is then mashed with addition of brine and fermented after addition of a yeast starter culture, preferably *Zygosaccharomyces rouxii*. A ripening phase generally follows the fermentation phase.

Particular preference is given to a process in which the solid fermentation is carried out during 40–70 hours at 30–35° C., preferably 48 hours at 30° C., the resulting *koji* is mashed in brine, so that the mash has a salt content of 4–10%, preferably 6–8%. The mash is then hydrolysed for 2–20 days at 30–45° C., preferably at 40° C. The starter yeast is then added and the mash is fermented for 2–4 weeks preferably at 30° C. A 2–12 week ripening phase at room temperature then follows.

The microorganisms participating in the culture process are preferably *Aspergillus oryzae*, *Aspergillus sojae* and the osmotolerant yeast *Zygosaccharomyces rouxii*.

The following examples illustrate the invention, and are not meant to be limiting in any way whatsoever.

EXAMPLE 1

375 g of sweet lupins of the cultivar "Minori" (protein content about 28%) are coarsely ground and swollen in water for 3 hours at room temperature. During the swelling, the lupin absorbs approximately 130% water.

125 g of wheat grains are lightly roasted in a circulated-air drying cabinet for 30 minutes at 100° C.

The wheat grains are mixed with the swollen lupin meal, distributed on a sieve-plate sheet in a thin layer and autoclaved for 10 minutes at 120° C.

The sterile substrate is inoculated with 50 ml of an *Aspergillus oryzae* spore suspension (starter DSM 1863). The 10% suspension (in sterile water) is produced from *koji* powder, which is obtained by solid culture of the fungal culture on oats/barley as substrate. The inoculated material is cultured at 30° C. in an incubation cabinet at high air humidity for 48 hours until a compact white fungal mycelium has grown (termed *koji*).

The *koji* is mashed, in a ratio of 1:2, in a 15% strength salt solution and is initially cultured for 4 days at 30° C., then for 14 days at 40° C. The pH falls to 5.1. The digested mash is then inoculated with the osmotolerant yeast *Zygosaccharomyces rouxii* (obtained from the Deutsche Stammsammlung für Mikroorganismen DSM) and fermented for two weeks at 30° C. A ripening phase of a further three weeks at room temperature follows.

The ripe mash liquid is separated from the residue via a screen before it is briefly boiled and clarified by membrane filtration. A seasoning liquid having approximately 19% DM is obtained.

The nitrogen content is 0.85% total N and the degree of hydrolysis is 63% (calculated as a ratio of free to bound amino acids).

The contents of glutamic and aspartic acids in the free amino acids are 22.4 and 12.0%, respectively, and that of arginine is 1.0%.

EXAMPLE 2

750 g of lupin cotyledons (seeds separated from the husks), coarsely ground to a diameter of 3–5 mm, of the cultivar "Minori" are used. The protein content is 35%. These cotyledons are swollen in water for three hours, during which they absorb 105% water. The cotyledons are then mixed with 250 g of lightly roasted wheat grains (30 minutes at 100° C. in a circulated-air cabinet). The substrate is inoculated with 100 ml of Aspergillus spore suspension and cultured (as described in Example 1). The resulting seasoning liquid has a DM content of 25% and a pH of 5.0.

The nitrogen content is 0.9% total N and the degree of hydrolysis 77%.

The contents of glutamic and aspartic acids in the free amino acids are 21.6 and 10.7%, respectively. Arginine could not be detected (cf. Table 3).

EXAMPLE 3

The experimental procedure is carried out as described under Example 1, but instead of the roasted wheat grains, 125 g of pearl barley were used as substrate together with 375 g of lupin meal. The two substrates are swollen together for three hours. The water absorption is 120%. The fermentation is carried out as under Example 1 and a seasoning liquid containing 18% DM is obtained, which has a pH of 4.95.

The nitrogen content is 0.75% total N and the degree of hydrolysis 68%.

The contents of glutamic and aspartic acids in the free amino acids are 18.1 and 12.4%, respectively, and that of arginine 0.3% (cf. Table 3).

EXAMPLE 4

Whole seeds of *Lupinus albus* (bitter) were boiled for 4 to 5 minutes and then husked. The cotyledons thus obtained had a dry matter content of 63%. 48 g of barley flakes were added to 300 g of these cotyledons and the whole was inoculated with a mixture of 2 g of barley flour and *Aspergillus oryzae* spores.

The inoculated lupin seeds were incubated with good ventilation for 2 days in a 20×30 cm aluminum dish at 30° C. and 80% relative humidity.

The slab, which was completely interspersed with fungal mycelium, was comminuted, 450 ml of a 10% strength salt solution were added and the mixture was cultured for three days at 40° C. In this process, the pH decreased to 4.9 and the grains could be readily squashed. To the mash having a DM content of 32% were added 1×10$^6$ dried *Lactobacillus brevis* cells. One day later, a suspension of the yeast *Zygosaccharomyces rouxii* is added and the mixture is fermented during two weeks.

After ripening for three months at room temperature and at a virtually constant pH (4.7–5.0), the mixture was centrifuged and the free amino acid spectrum was determined.

The contents of glutamic and aspartic acids in the free amino acids are 19.3 and 18.1%, respectively, and that of arginine 0.3% (cf. Table 3).

The nitrogen content is 2.1% total N and the degree of hydrolysis 61%.

This example shows that a glutamic-acid-rich and aspartic-acid-rich and low-arginine seasoning sauce may also be prepared from bitter lupins in the same manner as from sweet lupins.

and modifications can be made thereto without departing from the spirit or scope of the invention as set forth herein.

TABLE 2

Amino acid composition [%] of seasoning sauces made from lupins

|  | Bitterness factor | Example 1 | Example 2 | Example 3 | Example 4 |
|---|---|---|---|---|---|
| Glutamic acid |  | 22.4 | 21.6 | 18.1 | 19.3 |
| Aspartic acid |  | 12.0 | 10.7 | 12.4 | 18.1 |
| Glu + Asp |  | 34.4 | 32.3 | 30.5 | 37.4 |
| Threonine | — | 4.2 | 3.9 | 4.4 | 70 |
| Serine | — | 0.8 | 0.4 | 0.2 | 0.8 |
| Proline | 1 | 3.7 | 5.4 | 3.4 | — |
| Glycine | — | 2.9 | 2.4 | 2.9 | 4.0 |
| Alanine | — | 5.0 | 6.5 | 5.0 | 5.8 |
| Valine | 2 | 5.7 | 5.7 | 6.0 | 4.9 |
| Methionine | — | 0.7 | 1.0 | 1.0 | 1.6 |
| Isoleucine | 1 | 5.1 | 5.5 | 5.9 | 7.3 |
| Leucine | 1 | 9.5 | 9.3 | 10.4 | 10.3 |
| Tyrosine | 2 | 4.7 | 3.0 | 4.7 | 4.7 |
| Phenylalanine | 5 | 5.2 | 3.4 | 4.9 | 5.1 |
| Lysine | 0.5 | 5.5 | 4.9 | 5.9 | 6.9 |
| Histidine | 0.5 | 0 | 20 | 2.1 | 6.1 |
| Arginine | 20 | 1.0 | 0 | 0.3 | 0.3 |
| Tryptophan | 10 | 0 | 0.7 | 0.5 | 0.1 |
| Bitterness index |  | 80 | 69 | 81 | 66 |

TABLE 3

Amino acid composition of commercial soy sauces [%]

|  | Bitterness factor | 1 | 2 | 3 | 4 | 5 | 6 | 7 | 8 | 9 | 10 | 11 | 12 | Average |
|---|---|---|---|---|---|---|---|---|---|---|---|---|---|---|
| Glutamic acid |  | 12.1 | 16.7 | 19.2 | 15.9 | 16.4 | 14.5 | 13.5 | 11.0 | 17.8 | 17.1 | 16.1 | 16.6 | 15.7 |
| Aspartic acid |  | 6.2 | 6.4 | 7.3 | 3.5 | 8.4 | 7.9 | 9.7 | 9.4 | 7.1 | 6.0 | 8.8 | 8.2 | 7.2 |
| Glu + Asp |  | 18.3 | 23.1 | 26.5 | 19.4 | 24.8 | 22.4 | 23.2 | 20.4 | 24.9 | 23.0 | 24.9 | 24.8 | 23.0 |
| Threonine | — | 3.9 | 4.8 | 4.7 | 4.6 | 4.3 | 7.9 | 4.3 | 5.0 | 4.0 | 3.3 | 4.2 | 4.8 |  |
| Serine | — | 5.2 | 5.9 | 6.0 | 6.0 | 5.7 | 7.1 | 5.6 | 5.4 | 5.6 | 4.7 | 5.1 | 6.8 |  |
| Proline | 1 | 6.0 | 5.8 | 5.8 | 6.0 | 5.7 | — | 5.5 | 5.0 | 8.6 | 8.2 | 5.1 | 5.3 |  |
| Glycine | — | 2.9 | 3.3 | 3.7 | 3.1 | 3.5 | 3.2 | 3.4 | 3.3 | 3.3 | 3.1 | 3.6 | 3.6 |  |
| Alanine | — | 6.0 | 6.6 | 5.6 | 9.5 | 7.4 | 5.5 | 5.5 | 5.9 | 7.1 | 9.8 | 5.7 | 5.8 |  |
| Valine | 2 | 6.2 | 7.1 | 6.3 | 6.4 | 6.1 | 4.0 | 5.5 | 5.4 | 4.6 | 3.6 | 5.8 | 6.3 |  |
| Methionine | — | 1.7 | 1.9 | 1.5 | 1.8 | 1.2 | 3.1 | 1.5 | 0.5 | 1.5 | 2.2 | 1.2 | 1.5 |  |
| Isoleucine | 1 | 5.9 | 6.5 | 5.8 | 6.5 | 5.9 | 5.8 | 5.8 | 5.7 | 4.4 | 3.6 | 5.8 | 5.9 |  |
| Leucine | 1 | 8.8 | 9.9 | 8.8 | 10.1 | 9.6 | 8.1 | 9.2 | 9.7 | 9.6 | 187 | 9.2 | 8.7 |  |
| Tyrosine | 2 | 1.4 | 1.6 | 1.3 | 1.2 | 1.0 | 2.0 | 1.5 | 2.1 | 1.9 | 1.3 | 1.8 | 0.7 |  |
| Phenylalanine | 5 | 5.0 | 5.7 | 6.0 | 6.4 | 5.1 | 9.5 | 5.0 | 4.7 | 5.2 | 6.0 | 4.6 | 5.1 | 5.6 |
| Lysine | 0.5 | 5.3 | 6.1 | 6.0 | 5.7 | 7.8 | 5.5 | 7.2 | 8.7 | 6.1 | 2.4 | 6.5 | 6.3 |  |
| Histidine | 0.5 | 1.2 | 1.9 | 2.1 | 1.9 | 1.8 | 4.6 | 2.4 | 2.1 | 2.1 | 2.0 | 2.1 | 2.1 |  |
| Arginine | 20 | 4.5 | 4.9 | 6.0 | 7.1 | 4.7 | 8.7 | 5.0 | 4.0 | 4.2 | 2.9 | 5.7 | 6.6 | 5.1 |
| Tryptophan | 10 | — | — |  |  |  | 7.9 |  |  |  |  |  |  |  |
| Bitterness index |  | 154 | 171 | 190 | 222 | 161 | 253 | 160 | 145 | 151 |  | 131 | 177 | 19 |

The results of Examples 1 to 4 are summarized in Table 2. As a comparison therewith, corresponding analytical results of 12 commercially available soy causes are listed in Table 3.

The invention now being fully described, it will be apparent to one of ordinary skill in the art that many changes

What is claimed is:

1. A seasoning sauce which is obtained from lupins, said seasoning sauce comprising a protein and amino acids wherein said protein has a total nitrogen content of more than 0.70%, arginine content of less than 1.0% of the total amino acid content of the seasoning sauce, glutamic acid content of greater than 18% of the total amino acid content of the seasoning sauce, aspartic acid content of greater than 10% of the total amino acid content of the seasoning sauce and a degree of hydrolysis greater than 50% (calculated as free amino acids/total amino acids).

2. The seasoning sauce according to claim 1, wherein said protein comprises more than 25% acids based on the total amino acid content, wherein said acids are selected from the group consisting of glutamic acid, aspartic acid, and combinations thereof.

3. The seasoning sauce according to claim 1, wherein said lupins are sweet lupins.

4. The seasoning sauce according to claim 1, wherein said degree of hydrolysis is greater than 60%.

5. The seasoning sauce according to claim 1, wherein said seasoning sauce is of the koikuchi type.

6. The seasoning sauce according to claim 1, wherein said degree of hydrolysis is greater than 0.9% total N.

7. A process for producing a seasoning sauce comprising subjecting lupins, together with a carbohydrate source, to a solid culture as a mixture having a 20–70% wheat content, with addition of *Aspergillus oryzae* as starter culture, and then mashing the resulting *koji* with addition of brine and fermenting after addition of a yeast starter culture.

8. The process according to claim 7, wherein said solid culture fermentation is carried out during 40–70 hours at 30–35° C., the resulting *koji* is mashed in brine in such a manner that the mash has a salt content of 4–10%, the mash is hydrolysed for 3–20 days at 30–45° C., then *Zygosaccharomyces rouxii* is added as yeast starter culture, and the mash is fermented at 30° C. for 2–4 weeks, and allowed to ripen at room temperature for 2–12 weeks.

9. The process according to claim 7, wherein said carbohydrate source comprises wheat.

10. The process according to claim 7, wherein said wheat content is 40 to 60%.

* * * * *